U̇nited States Patent Office 3,682,896
Patented Aug. 8, 1972

3,682,896
PREPARATION OF 6-ACYLAMINOPENICILLANIC ACIDS
Kenneth David Hardy, Horsham, England, assignor to Beecham Group Limited, Brentford, Middlesex, England
No Drawing. Filed Feb. 10, 1970, Ser. No. 10,286
Claims priority, application Great Britain, Feb. 13, 1969, 7,756/69
Int. Cl. C07d 99/16
U.S. Cl. 260—239.1                 5 Claims

ABSTRACT OF THE DISCLOSURE 6-aminopenicillanic acid and 6-acylaminopenicillanic acids are prepared free from immunogenic macromolecules, for use in producing semi-synthetic penicillins, by a reaction under anhydrous conditions avoiding the use of enzymes and without hydrolytic cleavage of the β-lactam ring structure. The preferred process includes the use of a nucleophile in at least a catalytic amount for treating the starting material. A substance may also be employed which is both a nucleophile and an acid acceptor.

---

This invention relates to the preparation of penicillanic acids and is particularly concerned with the preparation of 6-aminopenicillanic acid and penicillins from N-(6-aminopenicillanoyloxy) imines or N-(6-substituted penicillanoyloxy) imines.

It is an object of the present invention to provide either semi-synthetic penicillins or 6-aminopenicillanic acid (which may subsequently be converted to semi-synthetic penicillins by conventional means) by a process which avoids the use of enzymes and hence the risk of contamination with an immunogenic macromolecule.

An advantage of the present invention is that the reaction takes place under anhydrous conditions and thus there is no danger of hydrolytic cleavage of the sensitive β-lactam ring of the compounds involved.

According to the present invention there is provided a process for the preparation of penicillanic acids of the general formula:

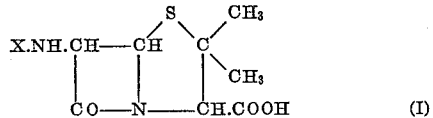

or a salt thereof, wherein X is a hydrogen atom or an acyl group, which process comprises treating a compound of the general formula:

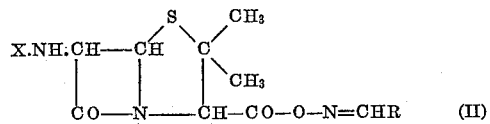

or its acid addition salt wherein R is an alkyl, aryl or heterocyclic group in an organic solvent or mixture of organic solvents with an acid acceptor. The acid acceptor may be a source of alkali metal ions or a tertiary amine, e.g. triethylamine, and it is preferably employed in at least one molecular proportion.

The group R in Formula II may be an alkyl group, especially an alkyl group having from 1 to 6 carbon atoms such as, methyl, ethyl, propyl or butyl; an aryl group such as phenyl; a heterocyclic group, particularly a monocyclic heterocyclic group such as pyridyl or furfuryl.

In a preferred form of the present invention the compound (II) is treated with a nucleophile in addition to the acid acceptor, said nucleophile being present in at least a catalytic amount. Many types of nucleophile may be used, particularly suitable ones being thiols, the thiocyanate ion and the iodide ion.

If desired, a single substance may be employed which functions as both acid acceptor and nuleophile. An example of one such substance is sodium thiophenoxide, which provides sodium ions as the acid acceptor and PhS⁻ ions as the nucleophile.

The starting N-(6-substituted penicillanoyloxy) imines (II: X=acyl) are described and claimed in our United States patent application No. 728,091, now Resissue Pat. No. 26,815 dated Mar. 10, 1970 and the starting N-(6-aminopenicillanoyloxy) imines (II: X=H) are described in our United States patent application 843,744.

When X in the above general formulae is an acyl group it is particularly convenient to select the solvents and reagents in such a way that a salt of the resulting penicillanic acid (I) crystallizes from the mixture, either directly or after the addition of another suitable solvent. It is in fact one function of the acid acceptor to provide the cation of such a salt. For example, when a benzylpenicillin derivative (II: X=PhCH₂CO) in dimethylformamide is treated with sodium thiophenoxide and then diluted with dry acetone the sodium salt of the penicillin crystallizes. If on the other hand the reagents are triethylamine and a catalytic amount of thiophenol then, provided the solvent has been suitably chosen, the triethylamine salt of the penicillin crystallizes. When two different cations are present the nature of the solid product will depend on the solubilities of the two penicillin salts in the particular solvent ssytem. Thus, when a benzylpenicillin derivative in acetone is treated with one molecular proportion each of triethylamine and potassium thiocyanate it is found in practice that the crystalline product is the potassium rather than the triethylamine salt of benzylpenicillin.

In some cases, however, the desired cleavage reaction takes place but no product crystallizes, in which case other procedures must be adopted to recover the product. One such procedure is to remove all or part of the organic solvent in vacuo, dilute the residue with water, and adjust to a suitable pH. When X is acyl this pH may be low (about 2) and the free acid form of the penicillin may be extracted into a suitable organic solvent, and recovered therefrom by conventional means. When X is hydrogen a suitable pH is in the neighborhood of the isoelectric point of 6–APA (i.e. about 4.3), so that this product may crystallize directly from the aqueous solution.

The important application of the present invention is in either the preparation of 6-aminopenicillanic acid (I, X=H) which is then acylated by known means to give the desired semisynthetic penicillin or in the preparation of penicillins (I: X=acyl) which cannot be prepared by direct fermentation.

The following examples illustrate the invention:

EXAMPLE 1

N-[6-[3-(o-chlorophenyl)-5-methylisoxazole-4-carbonamido]penicillanoyloxy]benzylidene imine N - (6 - aminopenicillanoyloxy)benzylidene imine p-toluene sulphonate (4.91 g. 0.01 mol.) mixed with dry acetone (30 ml.) was cooled to 0° C. and treated, with stirring, with triethylamine, (2.8 ml.) to give a clear solution. A solution of 3-(o-chlorophenyl)-5-methylisoxazole-4-carbonylchloride (2.56 g. 0.01 mol.) in dry acetone (10 ml.) was added all at once and stirred at 0° C. for 1 hour. The mixture was filtered through Celite and the clear filtrate evaporated under reduced temperature and pressure. The residue was dissolved in ethyl acetate (50 ml.), washed with N hydrochloric acid (10 ml.) followed by water (10 ml.) and dried over anhydrous magnesium sulphate. The dry solution after evaporation to small volume under reduced temperature and pressure was diluted with dry ether (3 vols.) and allowed to crystallize. The solid product was filtered off, washed with dry ether and dried in vacuo to give 3.8 g. (70.5%) of colorless crystalline solid M.P. 136–138° C. A small sample recrystallized from acetone/ether gave M.P. 144–146° C. (d). Found (percent): C, 57.65; N, 4.36; N, 10.32; S, 607; Cl, 705. $C_{26}H_{23}O_5N_4SCl$ requires (percent): C, 57.93; H, 4.30; N, 10.40; S, 5.95; Cl, 6.58.

EXAMPLE 2

Sodium 3-(o-chlorophenyl)-5-methyl-4-isoxazolyl-penicillin monohydrate

N-[6-[3 - (o-chlorophenyl) - 5 - methylisoxazole - 4-carbonamide]penicillanoyloxy]benzylidene imine (0.54 g., 0.001 mol.) dissolved in a mixture of dimethylformamide (1 ml.) and thiophenol (1 drop) was treated with triethylamine (0.28 ml.) and stood at room temperature for 2 hours. The solution was treated with 1.67 N sodium 2-ethylhexoate in methyl isobutyl ketone (0.6 ml., 0.001 mol.) followed by 2-ethyl hexoic acid (0.16 ml., 0.001 mol.) and evaporated under reduced temperature and pressure. The residual yellow oil was dissolved in methyl isobutyl ketone saturated with water (40 ml.), diluted with dry methyl isobutyl ketone (60 ml.) and stirred at room temperature for 1½ hours. The crystalline solid produced was filtered off, washed with methyl isobutyl ketone and dried in vacuo to give the penicillin monohydrate 0.3 g. (63.1%) as a colorless crystalline solid identical with authenic material by infrared spectra.

EXAMPLE 3

N-[6-(α-phenoxypropionamido)penicillanoyloxy]-2-furfurylidene imine

N-(6-aminopenicillanoyloxy) - 2 - furfurylidene imine benzenesulphonate (0.937 g., 0.002 mol.) in dry acetone (6 ml.) was cooled to 0° C. and treated with triethylamine (0.56 ml.) followed by a solution of α-phenoxypropionyl chloride (0.396 g., 0.002 mol.) in dry acetone (2 ml.). The mixture was stirred at 0° C. for 1 hour, filtered and the clear filtrate evaporated under reduced temperature and pressure. The residue was dissolved in ethyl acetate (20 ml.) and the solution washed successively with N hydrochloric acid (2 ml.), N sodium bicarbonate (2 ml.) and water (2 ml.). The ethyl acetate solution was dried over anhydrous magnesium sulphate and evaporated to small volume. The residue was diluted with dry ether to the faintest cloudiness and allowed to crystallize. The product was filtered off, washed with ether and dried in vacuo to give 0.47 g. (51.4%) of a colorless crystalline solid M.P. 128–134° C. Found (percent): C, 57.63; H, 5.12; N, 9.26; S, 7.18. $C_{22}H_{23}O_6N_3S$ requires (percent): C, 57.76; H, 5.07; N, 9.19; S, 7.01.

EXAMPLE 4

Sodium α-phenoxyethyl penicillin

N-[6 - (α - phenoxypropionamido)penicillanoyloxy]-2-furfurylidene imine (0.46 g., 0.001 mol.), dissolved in a mixture of dimethyl formamide (1 ml.) and thiophenol (1 drop), was treated with triethylamine (0.14 ml.) and stood at room temperature for 2 hours. The reaction solution was treated with 1.67 N sodium 2-ethylhexoate in methyl isobutyl ketone ,0.6 ml.) and evaporated under reduced temperature and pressure. The residue was dissolved in methyl isobutyl ketone saturated with water (20 ml.), was diluted with dry methyl isobutyl ketone (20 ml.) and stirred for 1 hour to crystallise. The solid product was filtered off, washed with acetone and dried to give the penicillin 0.23 g. (59.6%) as a colorless crystalline solid shown to be identical with authentic material by infra-red spectra.

EXAMPLE 5

Benzylpenicillin triethylamine salt (a) N-[6 - (phenylacetamido)penicillanoyloxy] - 2-furfurylidene imine (2.14 g., 0.005 mol.) in dimethyl formamide (5 ml.) was treated with triethylamine (1.4 ml.) and thiophenol (2 drops) and stirred for 2¼ hours at room temperature. The product that has separated was filtered off, washed with acetone and dried in vacuo to give a colorless crystalline solid 1.83 g. (84.2%) which was shown to be identical to authentic benzylpenicillin triethylamine salt by infra-red spectra.

(b) N - [6 - (phenylacetamido)penicillanoyloxy]benzylidene imine (4.37 g., 0.01 mol.) under the same conditions described in (a) above, gave a colorless crystalline solid 3.4 g. (78.2%) shown to be identical with authentic benzylpenicillin triethylamine salt by infra-red spectra.

(c) N - [6 - phenylacetamido)penicillanoyloxy] - 2-furfurylidene imine (2.14 g., 0.005 mol.) was added to a solution of ethanethiol (0.37 ml.) in dry acetone (5 ml.) and treated with triethylamine (0.7 ml.). The mixture was stirred at room temperature for 3¾ hours. The solid product was filtered off, washed well with acetone and dried in vacuo, to give a colorless crystalline solid 0.93 g. (42.8%) shown to be identical with authentic benzylpenicillin triethylamine salt by infra-red spectra.

EXAMPLE 6

Sodium benzylpenicillin (a) N - [6 - (phenylacetamido)penicillanoyloxy]benzylidene imine (2.14 g., 0.005 mol.) was added to a solution of sodium iodide (0.75 g., 0.005 mol.) in dry acetone (5 ml.) and treated with triethylamine (0.7 ml.). The mixture was stirred at room temperature for 2½ hours. The solid product was filtered off, washed well with acetone and dried in vacuo to give a pale cream crystalline solid 1.46 g. (82%) shown to be identical with authentic sodium benzylpenicillin by infra-red spectra.

(b) N - [6 - (phenylacetamido)penicillanoyloxy]benzylidene imine (2.14 g., 0.005 mol.) was added to a solution of sodium thiocyanate (0.41 g., 0.005 mol.) in dry acetone (5 ml.) and treated with triethylamine (0.7 ml.). The mixture was stirred at room temperature for 2¾ hours. The solid product was filtered off, washed well with acetone and dried in vacuo to give a colorless crystalline solid 1.15 g. (64.6%) shown to be identical with authentic sodium benzylpenicillin by infra-red spectra.

EXAMPLE 7

Benzylpenicillin potassium salt

N - [6 - (phenylacetamido)penicillanoyloxy]benzylidene imine (2.14 g., 0.005 mol.) was added to a solution of potassium thiocyanate (0.49 g., 0.005 mol.) in dry acetone (10 ml.) and treated with triethylamine (0.7 ml.). The mixture was stirred at room temperature for 4 hours. The solid product was filtered off, washed well with acetone to give a colorless crystalline solid 1.38 g. (74.2%) shown to be identical with authentic potassium benzylpenicillin by infra-red spectra.

EXAMPLE 8

N-[6-(2.6-dimethoxybenzamido)penicillanoyloxy]-2-furfurylidene imine

N - (6 - aminopenicillanoyloxy) - 2 - furfurylidene imine benzenesulphonate (0.937 g., 0.002 mol.) in dry acetone (6 ml.) was cooled to 0° C. and treated, with stirring, with triethylamine (0.56 ml.). A solution of 2.6-dimethoxybenzoyl chloride (0.4 g., 0.002 mol.) in dry acetone (2 ml.) was added all at once and stirred at 0° C. for 1 hour. The reaction mixture was filtered and the clear filtrate evaporated under reduced temperature and pressure. The residue was dissolved in an equal volume of ethyl acetate and the solution diluted with dry ether to the faintest cloudiness. Standing and scratching gave the product which was filtered off, washed with ethyl acetate and dried in vacuo to give 0.5 g. (52.8%) of off white crystalline solid M.P. 144–146° C. Found (percent): C, 55.55; H, 5.19; N, 8.54; S, 6.81. $C_{22}H_{23}O_7N_3S$ requires (percent): C, 55.80; H, 4.90; N, 8.87; S, 6.77.

EXAMPLE 9

Sodium 2,6-dimethoxyphenylpenicillin (a) N-[6-(2,6-dimethoxybenzamido)penicillanoyloxy]-2-furfurylidene imine (0.47 g., 0.001 mol.) in a mixture of dimethylformamide (1 ml.) and thiophenol (1 drop) was treated with triethylamine (0.14 ml.) and stood at room temperature for 2 hours. The yellow solution was treated with 1.67 N sodium 2-ethylhexoate in methyl isobutyl ketone (0.6 ml.) and evaporated under reduced temperature and pressure. The residue was dissolved in acetone (10 ml.), diluted with wet methyl isobutyl ketone (15 ml.) and the solution stirred for 1 hour to crystallise. The product was filtered off, washed with acetone and dried in vacuo to give the penicillin sodium salt 0.32 g. (79.6%) as a colorless crystalline solid shown to be identical with authentic material by infra-red spectra.

(b) N-[6 - (2,6 - dimethoxybenzamide)penicillianoyloxy]-2-furfurylidene imine 2.4 g., 0.005 mol.) in dry acetone (20 ml.) was treated with a solution of sodium iodide (0.75 g., 0.005 mol.) in dry acetone (10 ml.). The solution was treated with triethylamine (0.7 ml.) and stood at room temperature for 1 hour. Water (5 drops) was added and the mixture stirred for 4 hours to crystallise. The solid product was filtered off, washed with acetone and dried in vacuo to give a colorless crystalline solid 1.7 g. (84.5%) shown to be identical with authentic material by infra-red spectra.

(c) N - [6 - (2,6-dimethoxybenzamido)pencillianoyloxy]-2-furfurylidene imine (2.4 g., 0.005 mol.) in dry acetone (20 ml.) was treated with a solution of sodium thiocyanate (0.4 g., 0.005 mol.) in acetone (5 ml.). Triethylamine (0.7 ml.) was added and the solution stood at room temperature for 2 hours. Water (5 drops) was added and the mixture stirred for 4 hours to crystallise. The solid product was filtered off, washed with acetone and dried in vacuo to give a colorless crystalline solid 1.25 g. (61.1%) shown to be identical with authentic material by infra-red spectra.

EXAMPLE 10

N-[6-(phenylacetamido)pencillanoyloxy] pyridine-4-ylidene imine

Potassium benzylpenicillin (3.72 g., 0.01 mol.) in dry acetone (30 ml.) cooled to —5° C. was treated with ethyl chloroformate (0.96 ml.) and pyridine (2 drops). The mixture was stirred for ½ hour at —5° C. A solution of pyridine-4-aldoxime (1.22 g., 0.01 mol.) in dry acetone (10 ml.) was added and stirred for 2 hours at room temperature. The cloudy solution was filtered through Celite and the clear filtrate evaporated under reduced temperature and pressure. The residue dissolved in ethylacetate (30 ml.), was washed with N sodium bicarbonate (10 ml.) followed by water (10 ml.) and dried over anhydrous magnesium sulphate. The dry solution was evaporated to give the product 2.67 g. (61%) as a pale yellow non-crystalline gum.

EXAMPLE 11

Sodium benzylpenicillin

N - [6 - (phenylacetamido)pencillanoyloxy]pyridine-4-ylidene imine (2.19 g., 0.005 mol.) in dry acetone (20 ml.) was treated with a solution of sodium iodide (0.75 g., 0.005 mol.) in dry acetone (10 ml. followed by triethylamine (0.7 ml.) as described in Example 6(a) to give a colorless crystalline solid 0.56 g. (31.5%) shown to be identical with authentic material by infra-red spectra.

EXAMPLE 12

N-[6-phenylacetamido)pencillanoyloxy] butyrylidene imine

Potassium benzylpenicillin (3.72 g., 0.01 mol.) in dry acetone (30 ml.) cooled to —5° C. was treated with ethyl chloroformate (0.96 ml.) and pyridine (2 drops) and stirred for ½ hour at —5° C. n-Butyraldoxime (0.87 g., 0.01 mol.) in dry acetone was added and reacted as described in Example 10 to give the product 0.95 g. (23.6%) as a pale yellow non-crystalline gum.

EXAMPLE 13

Sodium benzylpenicillin

N-[6 - (phenylacetamido)pencillanoyloxy]butyrylidene imine (0.8 g., 0.002 mol.) in dry acetone (10 ml.) was treated with a solution of sodium iodide (0.3 g.) in dry acetone (5 ml.) followed by triethylamine (0.28 ml.) as described in Example 6(a) to give a colorless crystalline solid 0.16 g. (22.5%) shown to be identical with authentic material by infra-red spectra.

EXAMPLE 14

6-aminopenicillanic acid

N-(6-aminopenicillanoyloxy)benzylidene imine p-toluene sulphonate (0.49 g., 0.001 mol.) in diethylformamide (1 ml.) was treated with triethylamine (0.28 ml.) and thiophenol (2 drops) and stood at room temperature for 4 hours. The solution was diluted with water (5 ml.) and washed with ether (2× 5 ml.). The clear aqueous layer was adjusted to pH 4 with N hydrochloric acid and stirred for 16 hours. The solid product was filtered off, washed with water, dried in vacuo to give a cream colored crystalline solid 0.09 g. (41.7%) shown to be identical with authentic 6-aminopenicillanic acid by infra-red spectra.

EXAMPLE 15

N-[6-(phenylacetamido)penicillanoyloxy] ethylidene imine

Potassium benzylpenicillin (3.72 g., 0.01 mol.) in dry acetone (30 ml.) cooled to —5° C. was treated with ethyl chloroformate (0.96 ml.) and pyridine (2 drops) and stirred for ½ hour at —5° C. A solution of acetaldoxime (0.69 g., 0.01 mol.) in dry acetone (10 ml.) was added and the mixture stirred for 2 hours at room temperature. The product was worked up as described in Example 10 to give a pale yellow non-crystalline gum 1.28 g. (34.1%).

EXAMPLE 16

Sodium benzylpenicillin

N - [6 - (phenylacetamido)penicillanoyloxy]ethylidene imine (1.28 g.) in dry acetone (20 ml.) was treated with a solution of sodium iodide (0.52 g.) in dry acetone (5 ml.) followed by triethylamine (0.5 ml.) and stirred at room temperature for 2 hours. The solid was filtered off, washed well with acetone and dried in vacuo to give a colorless crystalline solid 0.42 g. (34.6%) shown to be identical with authentic material.

What we claim is:

1. A process for the preparation of a penicillanic acid of the formula:

$$\begin{array}{c} \phantom{XXXXXX} S \phantom{XX} CH_3 \\ X.NH.CH-CH \phantom{X} C \\ \phantom{XXXXXXXXXX} CH_3 \\ \phantom{XX} | \phantom{XXX} | \phantom{XXX} | \\ \phantom{XX} CO-N-\!\!-\!\!-CH.COOH \end{array}$$

or a non-toxic salt thereof, wherein X is benzoyl, which consists in reacting under anhydrous conditions without hydrolytic cleavage of the β-lactam ring a compound of the formula:

$$\begin{array}{c} \phantom{XXXXXX} S \phantom{XX} CH_3 \\ X.NH.CH-CH \phantom{X} C \\ \phantom{XXXXXXXXXX} CH_3 \\ \phantom{XX} | \phantom{XXX} | \phantom{XXX} | \\ \phantom{XX} CO-N-\!\!-\!\!-CH-CO-O-N=CHR \end{array}$$

or an acid addition salt thereof, wherein R is lower alkyl of 1 to 6 carbon atoms, phenyl pyridyl or furfuryl, in an organic solvent selected from acetone, dimethylformamide, thiophenol, ethanethiol and mixtures thereof, with sodium or potassium iodide or thiocyanate or sodium thiophenoxide, or triethylamine as acid acceptor.

2. A process according to claim 1, in which the acid acceptor is present in at least one molecular proportion.

3. A process according to claim 1, in which is further present a thiol, thiocyanate or iodide as nucleophile.

4. A process according to claim 3, in which the acid acceptor and nucleophile are both the same substance.

5. A process according to claim 3, in which the acid acceptor and the nucleophile are both sodium thiophenoxide.

References Cited

UNITED STATES PATENTS

| 2,941,995 | 6/1960 | Doyle et al. | 260—239.1 |
| 3,028,379 | 4/1962 | Sheehan | 260—239.1 |
| 3,047,467 | 7/1962 | Doyle et al. | 260—239.1 |
| 3,159,617 | 12/1964 | Sheehan | 260—239.1 |

NICHOLAS S. RIZZO, Primary Examiner

U.S. Cl. X.R.

260—306.7; 424—271